United States Patent [19]

Kosinski et al.

[11] Patent Number: 5,665,854

[45] Date of Patent: Sep. 9, 1997

[54] LOW TEMPERATURE NYLON POLYMERIZATION PROCESS

[75] Inventors: Leonard Edward Raymond Kosinski, Chadds Ford; Richard Robert Soelch, Landenberg, both of Pa.

[73] Assignee: E. I. Du Pont de Nemours and Company, Wilmington, Del.

[21] Appl. No.: 410,254

[22] Filed: Mar. 24, 1995

Related U.S. Application Data

[62] Division of Ser. No. 36,589, Mar. 25, 1993, Pat. No. 5,403,910.

[51] Int. Cl.$^6$ .................................................. C08G 69/28
[52] U.S. Cl. ..................... 528/336; 528/335; 528/338; 528/339; 528/340; 528/347; 528/349
[58] Field of Search ........................... 528/336, 335, 528/349, 340, 347, 338, 339

[56] References Cited

U.S. PATENT DOCUMENTS

| | | | |
|---|---|---|---|
| 3,193,535 | 7/1965 | Carter | 528/335 |
| 3,357,955 | 12/1967 | Bryan | 528/335 |
| 3,501,441 | 3/1970 | Brignac | 528/335 |
| 4,540,772 | 9/1985 | Pipper et al. | 528/335 |
| 4,925,914 | 5/1990 | Dolden | 528/336 |
| 5,109,106 | 4/1992 | Lahary et al. | 528/349 |
| 5,128,442 | 7/1992 | Pipper et al. | 528/336 |
| 5,162,491 | 11/1992 | Hammond, Jr. et al. | 528/349 |
| 5,194,577 | 3/1993 | Chen | 528/338 |
| 5,302,691 | 4/1994 | Soelch | 528/349 |
| 5,378,800 | 1/1995 | Mok et al. | 528/349 |
| 5,403,910 | 4/1995 | Kosinski et al. | 528/336 |

*Primary Examiner*—Samuel A. Acquah
*Assistant Examiner*—P. Hampton-Hightower

[57] ABSTRACT

A low temperature process for polymerizing nylon monomers to freely flowing polymers is disclosed. The polymerization process is carried out at lower than conventional polymerization temperatures and produces a freely flowing polymer without thermal degradation.

19 Claims, 1 Drawing Sheet

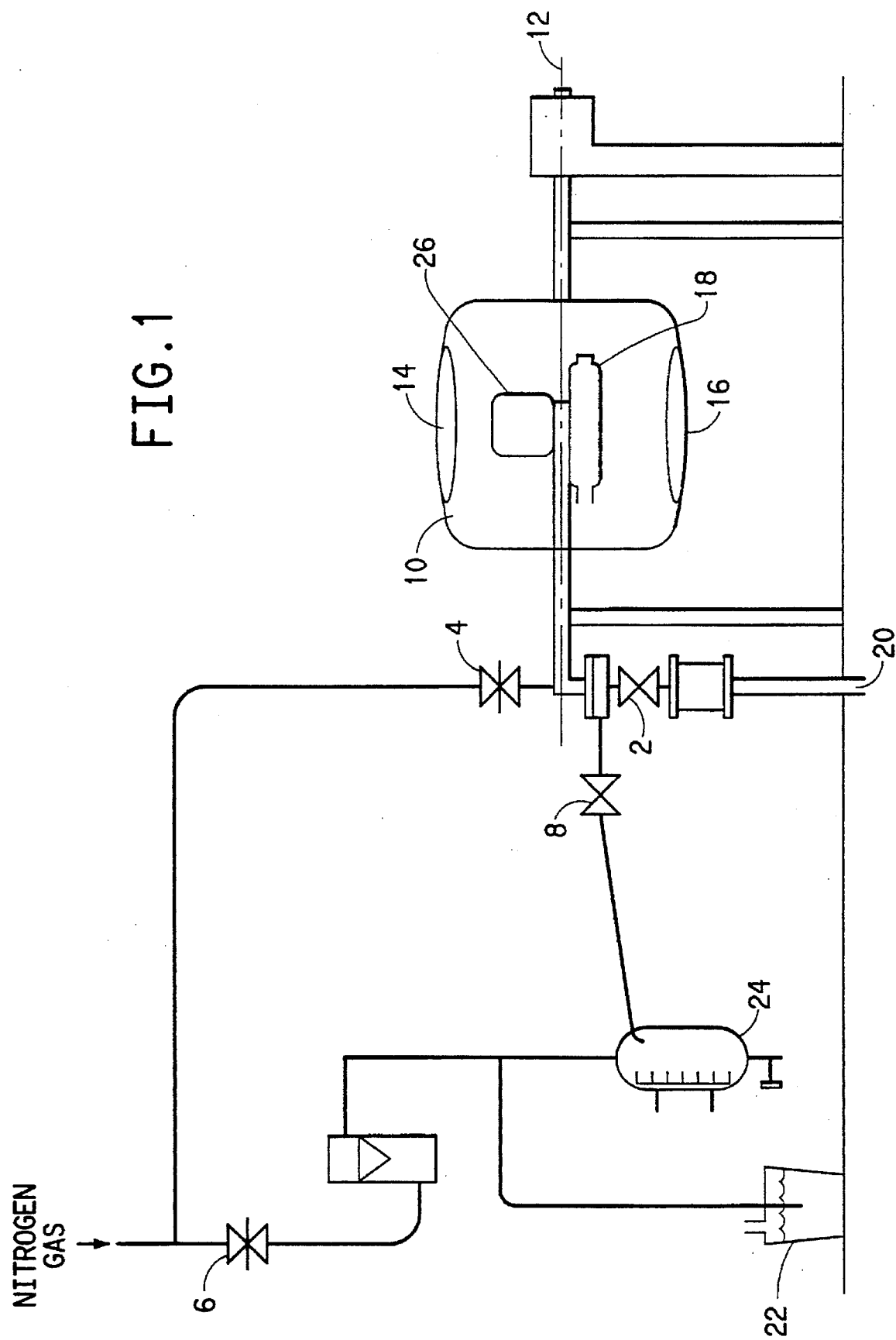

LOW TEMPERATURE NYLON POLYMERIZATION PROCESS

This is a division of application Ser. No. 08/036,589, filed Mar. 25, 1993, now U.S. Pat. No. 5,403,910, granted Apr. 4, 1995.

FIELD OF THE INVENTION

A low temperature polymerization process to produce freely flowing polyamide particles is disclosed. The polymerization process temperature is always such that the reacting mass never completely liquefies, i.e. at reaction temperatures below the melting points of the initial materials, the intermediate condensation products and the end products. The polymerization process produces a freely flowing polymer without substantial thermal degradation. The presence of a freely flowing product eliminates the need for granulation and/or pelletization process steps.

TECHNICAL BACKGROUND

This invention provides a process for the preparation of polyamide polymers. The process described herein has environmental advantages over known processes for preparing these products due to the reduction of emission gases in the process. The product produced by the process of the present invention also has a lower temperature history and thus improved quality, as judged by bishexamethylene triamine content, compared to products prepared by previously known processes.

Japanese Patent Application No. 4-93323, published Mar. 26, 1992, discloses a process for the preparation of polyhexamethylene adipamide comprising the steps of (a) Step 1 comprising polymerizing in the solid phase of an equimolar salt of adipic salt (sic., "salt" should be "acid") and hexamethylene diamine while replenishing the hexamethylene diamine in an amount commensurate with the amount of hexamethylene diamine which has escaped, so as to prepare a prepolymer;

(b) Step 2 comprising heating and melting the prepolymer from Step 1 and cooling for resolidification; and (c) Step 3 comprising polymerizing in the solid phase the solidified product from Step 2. The application further discloses that failure to implement each of the above three steps in the prescribed order will not permit generating a polyhexamethylene adipamide of this invention.

U.S. Pat. No. 5,128,442 discloses a process for the preparation of linear polyamide in which a solid salt of a diamine and a dicarboxylic acid having a content of catalytically effective phosphorous compound is heated in the solid phase to below the melting point of said salt, using an inert gas to continuously remove the water formed during the condensation reaction to give a precondensate. There is no disclosure of operation in the absence of the phosphorous containing catalyst nor in the absence of the nitrogen purge, nor in the presence of additional amine.

U.S. Pat. No. 4,925,914 disclosess a process for the preparation of high molecular weight homopolyamides from a nylon salt, uniformly preblended with a solid hypophosphite catalyst, dispersed in a liquid, aliphatic hydrocarbon. There is no disclosure of operation in the absence of the solid hypophosphite catalyst nor in the absence of the liquid, aliphatic hydrocarbon.

SUMMARY OF THE INVENTION

This invention provides a process for the preparation of polyamides which process comprises the steps of:

a) polymerizing under conditions such that the reacting mass never completely liquefies (i.e., at reaction temperatures below the melting transition temperatures of the initial materials, the intermediate condensation products and the end products), an oxygen free equimolar salt of a dicarboxylic acid and a diamine
1) in an oxygen-free environment,
2) at essentially atmospheric pressure,
3) while supplying amine, amines or carboxylic acids in an amount sufficient to achieve the desired balance of acid and amine ends,
4) under an inert gas atmosphere, either purged or unpurged,
5) while providing a degree of reacting mass motion to produce a freely flowing product; and b) further polymerizing the prepolyamide product of step 1 in the solid phase to a polyamide of desired molecular weight and then cooling the product in an oxygen-free environment. Nitrogen flow control during cooling can be used to ensure that the final product has the desired moisture content.

This invention also provides a process for the preparation of polyamides which process comprises the steps of:

a) polymerizing under conditions such that the reacting mass never completely liquefies (i.e., at reaction temperatures below the melting transition temperatures of the initial materials, the intermediate condensation products and the end products), an oxygen free aminocarboxylic acid
1) in an oxygen-free environment,
2) at essentially atmospheric pressure,
3) while supplying amine, amines or carboxylic acids in an amount sufficient to achieve the desired balance of acid and amine ends,
4) under an inert gas atmosphere, either purged or unpurged,
5) while providing a degree of reacting mass motion to produce a freely flowing product; and b) further polymerizing the prepolyamide product of step 1 in the solid phase to a polyamide of desired molecular weight and then cooling the product in an oxygen-free environment. Nitrogen flow control during cooling can be used to ensure that the final product has the desired moisture content.

This invention also provides a process for the preparation of copolyamides which process comprises the steps of:

a) polymerizing under conditions such that the reacting mass never completely liquefies (i.e., at reaction temperatures below the melting transition temperatures of the initial materials, the intermediate condensation products and the end products), an oxygen free equimolar diammonium dicarboxylate salts composed of one or more diamines and one or more dicarboxylic acids
1) in an oxygen-free environment,
2) at essentially atmospheric pressure,
3) while supplying amine, amines or carboxylic acids in an amount sufficient to achieve the desired balance of acid and amine ends,
4) under an inert gas atmosphere, either purged or unpurged,
5) while providing a degree of reacting mass motion to produce a freely flowing product; and b) further polymerizing the prepolyamide product of step 1 in the solid phase to a polyamide of desired molecular weight and then cooling the product in an oxygen-free environment. Nitrogen flow control during cooling can be used to ensure that the final product has the desired moisture content.

This invention also provides processes for the preparation of copolyamides where the starting material comprises (I) physical mixtures of one or more equimolar diammonium dicarboxylate salts (homopolymer or copolymer precursor salts) with one or more aminocarboxylic acids; (II) physical and or chemical mixtures of one or more aminocarboxylic acids; or (III) intimate chemical salts comprising one or more equimolar diammonium dicarboxylate salts (homopolymer or copolymer precursor salts) and one or more aminocarboxylic acids.

The invention also includes the products of the described processes.

DETAILED DESCRIPTION OF THE INVENTION

The process of the present invention utilizes as starting material either physical or chemical mixtures of any one or any combination of the following species: (i) equimolar diammonium dicarboxylate salts composed of one or more diamines and one or more dicarboxylic acids, and (ii) one or more aminocarboxylic acids.

The acid component of the nylon salt is suitably derived from aliphatic, alicyclic or aromatic dicarboxylic acids. Specific examples of such acids include adipic acid, suberic acid, sebacic acid, dodecanedioic acid, 1,2- or 1,3-cyclohexane dicarboxylic acid, 1,2- or 1,3-phenylene diacetic acid, 1,2- or 1,3-cyclohexane diacetic acid, isophthalic acid, terephthalic acid, 4-4-oxybis (benzoic acid), 4,4-benzophenone dicarboxylic acid, 2,6-naphthalene dicarboxylic acid, phenyl indane and p-t-butyl isophthalic acid. The preferred dicarboxylic acid is adipic acid.

The amine component of the nylon salt is suitably derived from an aliphatic, alicyclic or an aromatic diamine. Specific examples of such diamines include hexamethylene diamine, 2-methyl pentamethylenediamine, 2-methyl hexamethylene diamine, 3-methyl hexamethylene diamine, 2,5-dimethyl hexamethylene diamine, 2,2-dimethylpentamethylene diamine, 5-methylnonane diamine, dodecamethylene diamine, 2,2,4- and 2,4,4-trimethyl hexamethylene diamines, 2,2,7,7-tetramethyl octamethylene diamine, isophorone diamine, meta-xylylene diamine, paraxylylene diamine, diaminodicyclohexyl methane and $C_2$–$C_{16}$ aliphatic diamines which may be substituted with one or more alkyl groups. The nylon salts as specified herein are also meant to include amino-acids and lactams such as 12-aminododecanoic acid and caprolactam. The preferred diamine is hexamethylenediamine.

The aminocarboxylic acids as specified herein include 6-aminohexanoic acid, 7-aminohexanoic acid, 8-aminooctanoic acid, 9-aminopelargonic acid, 10-aminodecanoic acid, 11-aminoundecanoic acid, 12-aminododecanoic acid, as well as aminocarboxylic acids with alkyl side chains. The preferred aminocarboxylic acids are 6-aminohexanoic acid and 7-aminoheptanoic acid.

The process of the present invention, can be distinguished from previous processes in that it is operated in an oxygen-free environment, with low or no inert gas purge, with reaction mass motion, in the presence of make-up amines or carboxylic acids, with atmospheric water venting, and with no melt step necessary to produce a freely flowing, high molecular weight polyamide.

The process of the present process is carried out at temperatures below the melting point of the starting material salt, below the melting point of the polyamide product and below the melting point of any intermediate formed products. The process of the present invention does not form a completely liquid phase in the reacting mass at any time.

The product of the present invention is characterized by its possessing a high degree of crystallinity as indicated by its heat of melting as measured by differential scanning calorimetry.

The reactor used for the first polymerization step of this process may be any reactor that provides sufficient reacting mass motion such that a freely flowing product results. Such reactors are known in the art and include rotary drier type devices, horizontal or vertical low, medium or high intensity mechanically mixed reactors, screw type reactors, disk type devices, combinations of these devices or combinations of these devices with gas flow sufficient to contribute to reaction mass motion or heat transfer, fluid beds, and similar reactors, provided that sufficient reaction time, temperature and reaction mass motion can be can be employed to effect the desired conversion. The reactors that most effectively limit organic emissions from the process are those employing mechanical agitation with no or very low levels of additional non-monomeric inert gas purge through the polymerization zone and these are most desirable.

It is to be understood that the process of this invention whether carried out in a batch or continuous mode can be carried out in one or more than one appropriate equipment pieces. That is, the batch mode may utilize separate reactors for the first and second step. In the continuous mode the steps may be carried out in different zones of the same equipment piece or in different equipment pieces. In general, minimizing the number of equipment pieces is desirable.

The heat necessary to bring the salt starting material up to reaction temperature can be introduced to the reactor by any of the methods known in the chemical process art, for example, hot oil or steam. Microwave or radio frequency radiation can be used as the heat introduction method.

Advantages of the present process include improved product quality and reduced negative environmental impact. Improved product quality stems from the fact that the process results in extremely low thermal degradation process for making polyamides. The product is characterized by low levels of thermal degradation as measured by bis hexamethylene trtamine content. The reduced negative environmental impact, compared to known solid state processes, is due to significantly reduced or eliminated emission of gases from the polymerization reactor so as to reduce loss of organic components from the reactor and to make isolation of the remaining organic component effluents more efficient and cost effective. The process of the present invention, when operating on a salt prepared from a dicarboxylic acid and a diamine, is carried out in the presence of a diamine atmosphere. The diamine, for example hexamethylene diamine when preparing polyamide 6,6, is introduced into the reactor space in an amount sufficient to counteract diamine loss (i.e., in an amount sufficient to replace the diamine lost and yet attain the desired amine-acid ends balance in the product polyamide).

The amine compound used for ends balancing can be introduced as liquid, vapor or via the use of an in situ precursor. In the case of hexamethylene diamine, introduction can be achieved via the use of hexamethylene diamine carbamate as diamine precursor.

The process of the present invention can be catalyzed or accelerated by the introduction of from 0.1 to about 8% water to the starting salt.

The process of the present invention can be catalyzed or accelerated by the introduction of 6-aminohexanoic acid, solid or vapor, to dry diammonium dicarboxylic acid salt.

The process of the present invention can be catalyzed or accelerated by the use of polyamidation catalysts already known in the art, for example the class of catalytically effective phosphorous compounds.

The process of the present invention can be used to make copolymers for example a copolymer of nylon 6, 6 and 6-aminohexanoic acid.

The starting material in the below experiments, hexamethylene diammonium adipate salt is commercially available, for example, from BASF or Rhone Poulenc. Hexamethylene diamine employed was obtained from E. I. du Pont de Nemours and Co., Wilmington, Del. Hexamethylene diamine carbamate (DIAK®#1) was obtained from E. I. du Pont de Nemours and Co., Wilmington, Del.

Relative Viscosity (RV) is the formic acid relative viscosity measured as described at col.2, lines 42–51, in Jennings, U.S. Pat. No. 4,702,875, as follows: "The relative viscosity (RV) of polyhexamethylene adipamide is the ratio of the viscosity of a solution of 8.4 percent (by weight) polymer in a solution of 90 percent formic acid and 10 percent water (by weight) at 25° C., to the viscosity of the formic acid-water solution, per se, measured in the same units at 25° C." U.S. Pat. No. 4,702,875 is incorporated herein by reference. Amine and Carboxyl Ends are determined by the methods described on pages 293 and 294 in Volume 17 of the "Encyclopedia of Industrial Chemical Analysis" published by John Wiley & Sons (1973). The number average molecular weight (Mn) for a linear 6, 6 nylon may be calculated by dividing $2 \times 10^{-6}$ by the sum total of end groups (expressed in equivalents/$10^6$ grams of polymer) in the subject polyamide. The percent moisture in the polyamide product is determined by Karl Fischer titration, as on pages 301-2 of the Wiley Analytical encyclopedia.

DESCRIPTION OF THE DRAWING

FIG. 1 shows a modified larger scale Conaform® rotary reactor 10 which is Jacketed with a heating means (not shown). Reactor 10 is able to rotate about axis 12. Salt is inserted into reactor 10 through lids 14 or 16. If additional monomer is added to the system, it is added through Hoke® cylinder 18 Which is mounted within the reactor 10. Prior to beginning the reaction process, valve 2 is opened and air is evacuated from reactor 10 by means of pressure pump 20. Then, valve 2 is closed and valve 4 is opened to allow nitrogen into reactor 10. The vacuum pump operation, followed by nitrogen addition is repeated at least several times until the reactor is substantially free of air. The condensate line is also flushed of air between valves 6 and 8 and nitrogen is run though the condensate line. A bubble bucket 22 prevents air from coming back into the line. The condensate exits the reactor through vent filter 26 and eventually collects in the condensate receiver 24.

EXAMPLES

GENERAL PROCEDURES

LARGER SCALE ROTARY REACTOR (FIG. 1):

A No. 36 CONAFORM® Vacuum Drier with 8.8 gallon working capacity was modified to operate at atmospheric pressure without inert gas purge as shown in FIG. I. The jacketed rotary reactor was heated with recirculated hot oil.

A typical run was carried out as follows (specifics discussed in individual examples below). Dry nylon 6,6 salt (11.35 kg) and any additional monomer were added to the reactor.

In some runs, DIAK®1 (6-aminohexyl carbamic acid), which generates hexamethylenediamine and carbon dioxide at process temperatures, was added to a HOKE® cylinder that was sealed at one end (FIG. I). In every case, the amount of additional monomer in the HOKE® cylinder was insufficient to spill out of the open end of the cylinder even if monomer melting occurred. Thus, this apparatus served as a source of monomer vapor. The hot, tumbling polymerizing mass transferred heat to and thus actuated the monomer vaporizer.

The loaded reactor was then sealed and deoxygenated by evacuating to <10 mm through V2 (V4 and V8 were off) and then releasing the vacuum to 1 atm nitrogen through V4 (V2, V6, V8 off) 8 to 10 times while rotating the device at 6–8 rpm. After deoxygenation was complete the tubing was disconnected at V8 (on the condensate receiver side) and V6 was opened to flush the lines and condensate receiver, with a brisk flow of $N_2$, free of oxygen typically for 5 to 15 minutes (V2, V8 off). The line previously connected to V8 was plugged intermittently several times during the 5 to 15 minutes to cause $N_2$ flow into the bubble bucket to completely flush air from the system. Next the line was reconnected at V8, V8 was opened and V4 was closed so that $N_2$ flushed through the line to the bubble bucket. The $N_2$ flow was then reduced to the minimum necessary to keep a slow flow into the bubble bucket (ca 2–3 inches water).

The first step of the polymerization was then started by heating the vessel to initiate polymerization while tumbling at about 5–10 rpm. Due to the large unheated lids, on this particular vessel, it was important to allow the internal reaction mass temperature to reach 130° C. while limiting the wall temperature to 160° C. so that sufficient heat would be transferred to the lids in order to avoid significant condensation on these surfaces. Once the reacting mass reached 130° C. the wall temperatures were increased to the desired setpoint. This was important to obtain the desired freely flowing product. The prepolymerization process was tracked by condensate formation rate which starts slowly and then increases. The prepolymerization was usually run until the condensate collection rate dropped off significantly.

The second polymerization stage or finishing step was then initiated by increasing the batch temperature to the desired range and holding with tumbling until the desired degree of polymerization was attained. Once the polymerization was done, the oil system was cooled with water and the reactor was flushed with about 1–10 (2.5 seemed best) liters/minute nitrogen through V4 (V6 off) to help cool the product and drive the product moisture content down to the desired level. The product was discharged when cool.

STATIC BED TUBE REACTORS

These reactors are twin 12 inch high by 1 inch diameter tubes that are heated by complete immersion in a fluidized bed sand bath heater. The reactors have thermocouples through the bottom caps that reach to the center of the reacting masses. Each reactor has its own externally mounted pressure regulation valve (and relief device) connected through the reactor top. The lines and pressure regulation valves are heat traced and independently temperature controlled. It is imperative that this external plumbing be controlled at a temperature equal to or greater than the reactor temperature to ensure that condensate formation in the lines or pressure regulation valve is avoided (unless it is intended to operate these lines as partial condensors).

LARGE ROTARY REACTOR EXAMPLES (Tables 1, 2, 3)

Experiment 1 showed that prepolymerization, with no additional monomer to produce a freely flowing product, gave an undesirable amine end deficit of 154 (moles/1,000,000 g polymer).

Experiment 2 was run like Experiment 1 through step 1 however the second solid finishing step was added. The amine end deficit was essentially the same (i.e., undesirable) as in Experiment 1 thus showing that amine loss during the second step is low, and also that deficiencies during step 1 are not cured during step 2.

Example 1 shows that using DIAK®1 (known to thermally generate hexamethylenediamine and carbon dioxide essentially completely within minutes at 160° C.) produced a high RV nylon with an endgroup balance within commercially practiced levels (Zytel®101, a standard grade nylon 6,6 sold by DuPont was analyzed and had an amine end deficit of 34 and an RV of 51). Thus, Example 1 has an endgroup imbalance within the commercially useful range.

Another nylon (Example 2), prepared essentially as in Example 1 but with longer second stage reaction time was 41 RV and was analyzed for the trifunctional amine degradation product bis-hexamethylenetriamine and compared with Zytel®101 both before and after injection molding into test bars (Table 2 below). The results show the very low level of degradation in the experimental product plus the fact that this advantage is clearly maintained in objects prepared by the invention even after high temperature melt processing.

high molecular weight polyamides from polymers prepared via the current process.

TABLE 3

| Solid phase polymerization of the product of Example 1 | | | | | |
|---|---|---|---|---|---|
| Example | Precondition | Polymerization | RV | SUM | DELTA |
| 3 | 180° C./1 hr | 235° C./6 hr (steam) | 55 | 126 | 50.4 |
| 4 | 180° C./1 hr | 235° C./12 hr (steam) | 101 | 91 | 44 |
| 5 | 180° C./1 hr | 235° C./18 hr (steam) | 138 | 81 | 47.6 |
| 6 | — | 235° C./24 hr (steam) | 191 | 66 | 47 |

It is known in the art that solid polymerization generally produces materials with non-equilibrium molecular weight distributions which rapidly equilibrate to normal distributions upon melting (Feldmann, V. R., Angew. Makromol. Chem., 1973 34 (460) 1–7) and this is manifested in a solution viscosity being higher than would be expected based upon number average molecular weight, $M_n$. The relation between solution viscosity and $M_n$ is a very useful and reliable qualitative indicator of molecular weight distribution. Molecular weight distribution determination by gel permeation chromatography tends to be quite sensitive to subtle differences in test procedures and interpretation of data and so it is difficult to compare results obtained in different laboratories. Solid polymerized polyamides of the

TABLE 1

| | | LARGER SCALE ROTARY REACTOR POLYMERIZATIONS | | | | |
|---|---|---|---|---|---|---|
| SAMPLE | ADDITIONAL[1] MONOMER | FIRST STEP[2] PREPOLYMERIZATION TIME | SECOND STEP[3] SOLID FINISHING TIME/TEMP (°C.) | RV | PRODUCT DELTA (—NH$_2$)[4] | SUM[5] |
| Experiment 1 | — | 10.7 hrs | — | 7.8 | 154 | 535 |
| Experiment 2 | — | 10.5 hrs | 4.0 hr/232 | 21.2 | 152 | 202 |
| Example 1 | DIAK®1 1.55% | 11.25 hrs | 5.3 hr/227 | 32 | 41 | 161 |

[1][(Monomer weight)/(Salt weight)] * 100
[2]Elapsed time from when reacting mass reached 130° C. until the condensate collection was essentially complete.
[3]Elapsed time (and final temperature) from end of prepolymerization until cooling water was turned on.
[4]Delta (—NH$_2$) indicates difference in ends (Acid − Amine).
[5]Sum indicates sum of ends (Acid + Amine).

TABLE 2

| COMPARISON OF DEGRADATION (Example 2 vs Zytel ® 101) | | | | |
|---|---|---|---|---|
| | AS POLYMERIZED | | AS INJECTION MOLDED | |
| SAMPLE | RV | BHMT[1] mg/g polymer | RV | BHMT mg/g |
| polymer Example 2 | 40 | 0.06 | 46 | 0.06 |
| Zytel ® 101 | 52 | 0.22 | 57 | 0.22 |

[1]Bishexamethylene triamine (BHMT) units are mg BHMT per g polymer.

STATIC BED TUBE REACTORS

Preparation of Very High Molecular Weight Nylon With Desirable Molecular Weight Distribution Table 3 lists run data and results for continued polymerization of nylon prepared in Example 1. It shows successive increases in RV up to very high levels. Thus, the previously known solid phase process can be used for preparing very prior art generally have a somewhat higher solution viscosity than expected based upon $M_n$ (in comparison with polyamides prepared in the melt) and this indicates a somewhat broadened molecular weight distribution. When the prior art solid polymerized polyamides are melted, however, the solution viscosity decreases while $M_n$ remains constant and this is interpreted as an equilibration to normal molecular weight distribution. Comparison of a commercially available, very high molecular weight nylon 6,6 (Zytel®42) with the high molecular weight nylon prepared by the solid process (Example 5) reveals that ZYTEL®42 has a higher RV than Example 5, but essentially identical $M_n$ (Table 4). This is an indication that Example 5 has a narrower molecular weight distribution than the commercially useful ZYTEL®42.

TABLE 4

Zytel® 42 vs Example 5

| SAMPLE | RV | Sum of Ends | Mn |
| --- | --- | --- | --- |
| Example 5 | 191 | 66.5 | 30,075 |
| Zytel® 42 | 221 | 66.3 | 30,166 |

Prepolymerization catalysis by water

Table 5 shows three twin tests of moisture catalysis of solid salt prepolymerization carried out in static bed tube reactors. In each case a small amount of moisture increased the rate of reaction as indicated by product RV (compare: Example 7 with 8; Example 9 with 10; Example 11 with 12). This is contrary to what is known about driving the polyamidation equilibrium to high molecular weight where higher moisture produces lower molecular weight.

TABLE 5

MOISTURE CATALYSTS OF SALT SOLID PREPOLYMERIZATION

| Example | Starting Material | % H$_2$O | T (C) | t (hr) | P (Aim/ Actual) | Product RV |
| --- | --- | --- | --- | --- | --- | --- |
| 7 | 6,6 salt | 4.8% added at onset | 180° C. | 4 | 1 atm | 4.1 |
| 8 | 6,6 salt | (1) dry | 180° C. | 4 | 1 atm | 2.9 |
| 9 | 6,6 salt | 4.8% added at onset | 180° C. | 4 | 1 atm | 3.5 |
| 10 | 6,6 salt | (1) dry | 180° C. | 4 | 1 atm | 2.5 |
| 11 | 6,6 salt | 4.8% added at onset | 175° C. | 6 | 1 atm | 2.4 |
| 12 | 6,6 salt | (1) dry | 175° C. | 6 | 1 atm | 2 |

(1) Dry salt typically had 200–300 ppm H$_2$O when analyzed at 150° C. for 60 minutes

ROTOVAPOR EVAPORATOR DESCRIPTION

Laboratory scale reactions were performed using a Buchi Rotovapor Model R110 configured as discussed below. A standard condenser with its glass stopcock and a graduated receiving flask were used unless otherwise noted. Typically, a shortened steam duct was used where the steam duct extended into the condenser only as far as the top of the condenser screw cap. Connected to the steam duct was a modified rotary evaporator trap whose inner tube was modified so as to extend ca. 1 centimeter into the bottom of the trap. The evaporator trap connected to the steam duct was used to condense and collect the water formed during reaction. The next vessel was the reactor which was either a round bottom flask or a standard rotary evaporator trap with the inner tube (from the bottom) loosely packed with glass wool. When the rotary evaporator trap was used as the reactor a round bottom flask was connected to the bottom trap joint. The rotary evaporator trap reactor used the connected round bottom flask to generate vapor which in turn entered the reactor vessel. The Rotovapor apparatus was positioned so as to have its axis (i.e., from glass stopcock to the center of the reactor vessel) in a nearly horizontal orientation.

The glass stopcock of the Rotovapor standard condenser was used as the connection for reaction atmosphere control and for reactor thermocouple entrance. The glass stopcock was connected to a vacuum system which could also controllably supply a positive pressure of an inert gas. The vacuum/inert gas system was used to deoxygenate the reactant charged Rotovapor apparatus atmosphere prior to heating to reaction temperature. Deoxygenation was affected by repeating five times the cycle of evacuation at 500 millimeters mercury vacuum followed by a ca. 50 millimeters mercury positive pressure of inert gas.

A gas bubbler was usually used in these experiments to blanket the reactor atmosphere with an inert gas. After deoxygenation, a gas bubbler was formed by: feeding a controlled amount of an inert gas through a tube, splitting the inert gas supply tube into two tubes using a tee connector, connecting the opposite end of one tube to a gas bubbler containing water (ca. 2.5 centimeters in depth), and connecting the second tube's opposite end to the glass stopcock discussed earlier. The inert gas flow through the gas bubbler was started upon completion of the deoxygenation cycle. Usually, the glass stopcock extension into the Rotovapor apparatus was ca. 3.5 centimeters into the standard condenser section. Occasionally, the Rotovapor glass stopcock was replaced with a different plug which afforded options of: thermocouple entrance to reach the reactor vessel, inert gas inlet (with adjustable outlet position ranging from the standard condenser section to the reactor vessel), and inert gas outlet. Use of the different plug options will be noted in the later text as appropriate.

The reaction vessel(s) section of the apparatus was placed in a Fisher Model 281 oven. The oven door had a U-shaped notch to allow flask neck clearance, and the door was insulated to prevent heat losses. The oven used a nitrogen purge gas to keep the uppermost sections of the reactor vessel necks hot. The modified rotary evaporator trap was positioned outside the oven door and ambient air cooling was sufficient to affect condensation in this trap. The oven heater was turned on and the reactor vessel rotated at ca. 10 to 80 rotations per minute to begin the approach to reaction conditions. The oven reached to within 90 percent of the set temperature within 30 to 45 minutes, and holding to within ±2 degrees Centigrade of the set point within 1.5 to 2 hours after the oven heater was started.

EXAMPLE 13

6-AHA (6-aminohexanoic acid) AS A NYLON 6,6 SALT POLYMERIZATION INITIATOR/ ACCELERATOR The data in Table 6 below exemplify that relatively small amounts of 6-AHA serve to initiate and/or acccelerate the solid state polyamidation reaction for nylon 6, 6 salt. The nylon 6, 6 samples containing the relatively small amounts of 6-AHA show significantly higher levels of conversion than either the unadulterated nylon 6, 6 salt or the 6-AHA. The sample containing 5 weight percent 6-AHA resulted in a fused sample with individual particle boundaries clearly evident. The 5 percent 6-AHA product agglomeration indicates that either a faster rate of water vapor removal or that more vigorous interparticle motion are needed to produce a freely flowing product under these reaction conditions.

The data in Table 6 were obtained using a ca. 50 gram total reactant charge of separate nylon 6, 6 salt and 6-AHA in the amounts indicated. All of the data in Table 6 were generated using identical conditions and the same Rotovapor apparatus configuration. The Rotovapor used a 1000 ml round bottom flask as the reactor, the modified evaporator trap for condensation, the shortened steam duct, and the glass stopcock connection to a nitrogen bubbler. Nitrogen flow through the bubbler was 49.7 cubic centimeters per minute for all cases in Table 6. Rotation rates of 12 to 60 rotations per minute were used. For all Table 6 reactions, the conditions were 6 hours at an oven temperature of 165±2 degrees Centigrade.

Percent conversions appearing in Table 6 were estimated as total water produced via reaction (i.e., amount collected in condensator trap plus water absorbed on product) multiplied by 100 percent and divided by the theoretical amount of water from complete conversion.

TABLE 6

| | Weight Percent Nylon 6.6 Salt | Weight Percent 6-AHA | Relative Viscosity | Percent Conversion |
|---|---|---|---|---|
| A | 100.0 | 0.0 | 2.86 | 33 |
| B | 99.95 | 0.05 | 3.39 | 42 |
| C | 99.50 | 0.50 | 3.97 | 62 |
| D | 98.00 | 2.00 | 6.44 | 82 |
| E | 95.00 | 5.00 | 10.37 | 103* |
| F | 0.0 | 100.0 | 2.22 | 24 |

*A white solid film indicating solid carryover was noticed in the condensate trap which would explain the conversion, calculated on the basis of water vapor trapped, appearing to be greater than 100%

What is claimed is:

1. A process for the preparation of polyamides which process comprises the steps of:
   a) polymerizing under conditions such that the reacting mass never completely liquefies, at reaction temperatures below the melting transition temperatures of the initial materials, the intermediate condensation products and the end products, an oxygen free aminocarboxylic acid,
   1) in an oxygen-free environment,
   2) at essentially atmospheric pressure,
   3) while supplying amine, amines, diamines or carboxylic acid(s), in an amount sufficient to achieve the desired balance of acid and amine ends,
   4) under an inert gas atmosphere, either purged or unpurged,
   5) while providing a degree of agitation to maintain the necessary level of motion in the mass to produce a freely flowing product;
   6) in the substantial absence of a solvent, suspending agent or diluent; and
   b) further polymerizing the prepolyamide product of step (a) in the solid phase to a polyamide of desired molecular weight and then cooling the product in an oxygen-free environment.

2. A process for the preparation of copolyamides which process comprises the steps of:
   a) polymerizing under conditions such that the reacting mass never completely liquefies, at reaction temperatures below the melting transition temperatures of the initial materials, the intermediate condensation products and the end products, wherein the starting materials are selected from (i) an oxygen free equimolar diammonium dicarboxylate salt composed of one or more diamines and one or more dicarboxylic acids, provided that the salt is composed of more than one of at least one of the diamine and the dicarboxylic acid, (ii) physical mixtures of one or more equimolar diammonium dicarboxylate salts (homopolymer or copolymer precursor salts) with one or more amino carboxylic acids; (iii) physical and or chemical mixtures of one or more than one amino carboxylic acid; and (iv) chemical salts comprising one or more equimolar diammonium dicarboxylate salts (homopolymer or copolymer precursor salts) and one or more amino carboxylic acids,
   1) in an oxygen-free environment,
   2) at essentially atmospheric pressure,
   3) while supplying amine, amines, diamines or carboxylic acid(s), in an amount sufficient to achieve the desired balance of acid and amine ends,
   4) under an inert gas atmosphere, either purged or unpurged,
   5) while providing a degree of agitation to maintain the necessary level of motion in the mass to produce a freely flowing product;
   6) in the substantial absence of a solvent, suspending agent or diluent; and
   b) further polymerizing the prepolyamide product of step (a) in the solid phase to a polyamide of desired molecular weight and then cooling the product in an oxygen-free environment.

3. The process of claim 2 wherein the diamine is introducted as a liquid, as a vapor or by use of an in situ diamine precursor.

4. The product of the process of claim 1.

5. The product of the process of claim 2.

6. The process of claim 1 wherein step a or step b or step a and step b is (are) conducted in the presence of a catalyst.

7. The process of claim 1 wherein step a or step b or step a and step b is (are) conducted in the presence of a catalyst.

8. The process of claim 2 wherein step a or step b or step a and step b is (are) conducted in the presence of a catalyst.

9. The process of claim 1 wherein the catalyst in step a is selected from the group consisting of water, 6 AHA and $C_6$–$C_{12}$ amino carboxylic acid.

10. The process of claim 1 wherein the catalyst in step a is selected from the group consisting of water, 6 AHA and $C_6$–$C_{12}$ amino carbolyxic acid.

11. The process of claim 2 wherein the catalyst in step a is selected from the group consisting of water, 6 AHA and $C_6$–$C_{12}$ amino carbolyxic acid.

12. The process of claim 1 wherein the aminocarboxylic acid is deoxygenated through repeated cycles involving evacuation to a vacuum and then releasing into vacuum inter gas prior to step a.

13. The process of claim 2 wherein the starting materials are deoxygenated through repeated cycles involving evacuation to a vacuum and then releasing into vacuum inter gas prior to step a.

14. The process of claim 1 wherein the polyamide product from step b is cooled with an inert gas sweep.

15. The process of claim 2 wherein the polyamide product from step b is cooled with an inert gas sweep.

16. The process of claim 2 wherein the diamine is formed from an aminocarbamic acid.

17. The process of claim 2 wherein the diamine is formed from an aminocarbamic acid.

18. The process of claim 1 wherein the diamine is 6-aminohexylcarbamic acid.

19. The process of claim 1 wherein the diamine is 6-aminohexylcarbamic acid.

* * * * *